R. P. BARNSTEAD.
ELECTRIC WATER HEATER.
APPLICATION FILED MAY 6, 1918.
1,286,498.
Patented Dec. 3, 1918.
2 SHEETS—SHEET 2.
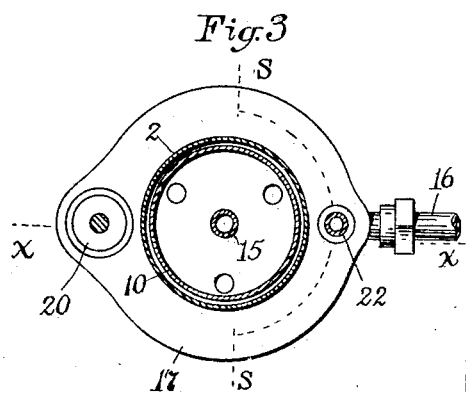
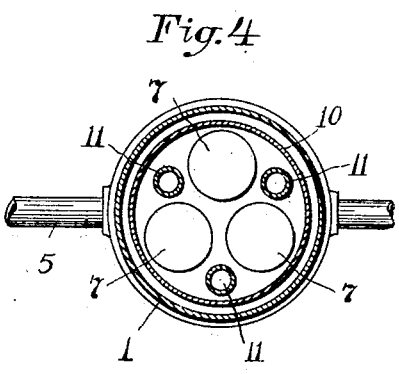
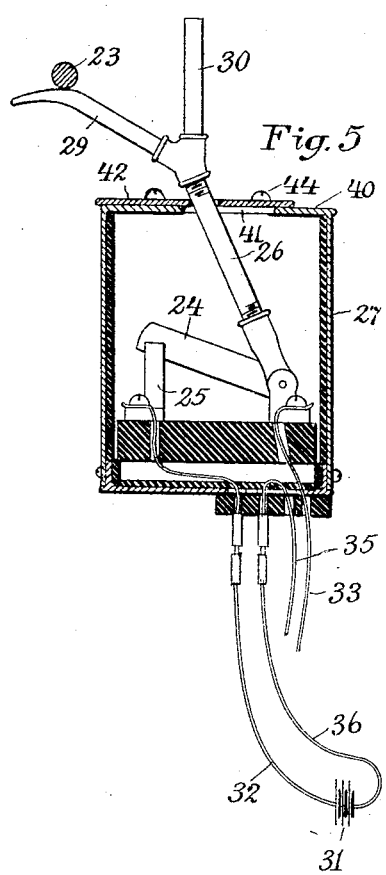
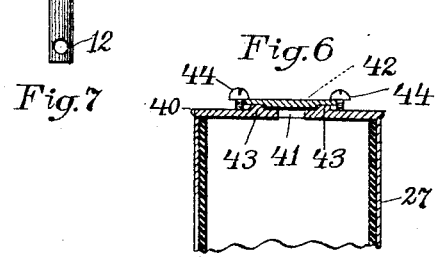
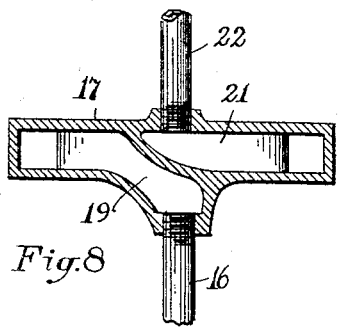
Inventor,
Robert P. Barnstead;
By A. B. Upham,
Attorney.

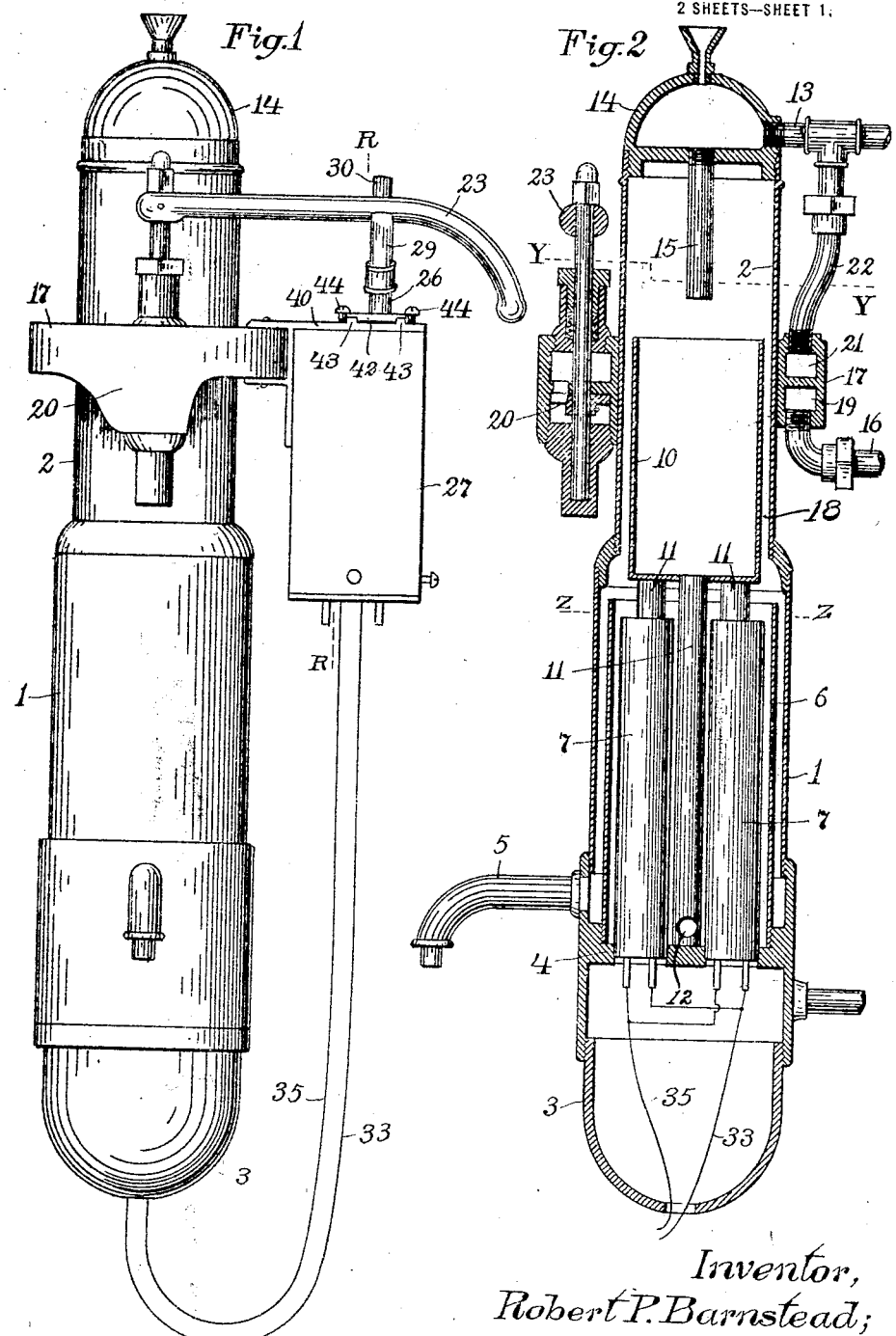

UNITED STATES PATENT OFFICE.

ROBERT P. BARNSTEAD, OF BOSTON, MASSACHUSETTS.

ELECTRIC WATER-HEATER.

1,286,498. Specification of Letters Patent. Patented Dec. 3, 1918.

Application filed May 6, 1918. Serial No. 232,758.

*To all whom it may concern:*

Be it known that I, ROBERT P. BARNSTEAD, a citizen of the United States, and a resident of Boston, in the county of Suffolk and Commonwealth of Massachusetts, have invented certain new and useful Improvements in Electric Water-Heaters, of which the following is a full, clear, and exact specification.

The object of this invention is the construction of a water heater wherein, as the water is turned on or off therefrom, an electric heating device therefor will have its current automatically cut in or out therefrom; and which shall have certain other improvements in details hereinafter set forth.

In the drawings forming part of this specification, Figure 1 is an elevation of an electric water heater embodying my improvements. Fig. 2 is a central vertical section of the same through the dotted line X—X in Fig. 3. Fig. 3 is a horizontal section on the line Y—Y in Fig. 2. Fig. 4 is a horizontal section on the line Z—Z in Fig. 2. Fig. 5 is a vertical section through the line R—R in Fig. 1. Fig. 6 is a sectional detail view of the top part of the switch box. Fig. 7 is an elevation of the lower end of one of the circulation tubes. Fig. 8 is a vertical section through the line S—S in Fig. 3.

As shown in Fig. 2, the heater comprises three main chambers, the central one designated by the reference character 1 containing the heater units; the upper chamber 2 being the water receiver, and the lower one 3 containing the electric connections. Near the bottom 4 of the chamber 1 is an outlet 5 from which the heated water is delivered, and from the bottom rises a jacket 6 nearly to the upper end of the chamber 1, the jacket being joined water-tight to the bottom and spaced from the chamber wall. Within this jacket 6 and fitted water tight in suitable holes cut through the bottom 4, are the heater units 7, preferably three in number, as shown in Fig. 4, and rising nearly to the upper edge of the jacket.

A short distance above the heater units is a water receiver 10 spaced from the wall of the chamber 2, and having three tubes 11 descending from its bottom to the bottom 4. These tubes come between the heater units and have each a lateral hole 12 at its lower end, as shown in Fig. 7, for the escape of water therefrom. Water being received from a pipe 13 into the vented chamber 14, descends therefrom through a short pipe 15 into the receiver 10, and from thence through the pipes or tubes 11 to the bottom of the jacket 6, the pipe 15 being of ample capacity to give escape to all the water received from the pipe 13.

When a comparatively small amount of water is admitted it is all accommodated by the tubes 11 and hence all flows from the holes 12 and thence up past the surfaces of the heater units 7 and overflows over the top edge of the jacket to the space between the latter and the chamber wall 1. If more water is admitted than can be accommodated by the tubes 11, the receiver 10 fills up and then overflows its top edge down the space included between it and the chamber wall 2. The jacket 6 being already full, this descending water passes at once to the annular space 18 and thence out through the spout or outlet 5, which is always open.

The admission of water is controlled in the following manner: As shown in Fig. 2, the pipe 16 brings water to one end of the annular water passage 17, which end 19 is shown in Fig. 8. From this point the water passes around to a valve 20 and through the same (when open) to the end 21, from which it rises through the pipes 22, 13 into the vented chamber 14. The valve 20 is of well known form and is illustrated in Fig. 2 as open. For the manipulation of this valve, a handle 23 is provided, as shown in Fig. 1, the same being prolonged for the purpose of engaging a switch handle which controls the current to the heater units 7. The switch 24 is shown in Fig. 5 as in engagement with a contact 25, and having its handle 26 terminating above the switch box 27 in branches 29, 30, said part 26 being composed of insulating material. When the valve handle 23 is pulled forward, it comes against the branch 29 and forces the switch 24 into engagement with the contact 25, the valve being disposed so that water begins to pass through it before the branch is reached. This is very important in order that no current will be switched to the heaters before the water begins to flow about them.

When the valve handle 23 has thus been drawn past the branch 29, the water begins its circulation about the heater units 7, and the current begins its heating action in them, current of any suitable intensity being provided represented in a conventionalized manner by a battery 31. The circuit from the source 31 passes through a wire 32 to the contact 25, thence through the switch 24, a wire 33 to the heater units 7, and back through a wire 35 to the box 27 and a wire 36 to the source 31.

By swinging the valve handle 23 but a short distance, but far enough to switch on the current, a small amount of water is admitted to the heaters and consequently it is soon raised to a high temperature. By bringing the handle farther forward, the amount of water passing through the heater is increased and its temperature correspondingly diminished since it has insfficient time to become so heated. Thus the temperature may be still further reduced until the valve is wide open and the volume passing through the heater is so great as to be incapable of any appreciable heating and it consequently issues from the outlet practically cold. Hence this heater can deliver water through all the gradations from boiling, hot, warm, tepid to cold.

Another important feature of this heater is that the units 7 are all below the top edge of the jacket or shell 6, and are hence always submerged beneath the water therein and prevented from getting overheated, which is the most injurious thing which can ordinarily happen to the heaters. To make sure of the submergence when the heater is used for the first time, the valve handle 23 is swung forward to admit the water, and the switch handle is immediately moved back to cut out the current before it can harm the units 7; but as soon as the jacket or shell 6 is filled and overflowing, the switch handle can be brought forward and current cut in to the heater.

As the jacket or shell will thereafter remain filled, it is no longer necessary to repeat this action, but the valve handle can at any time be swung forward with the full assurance of receiving water of the desired temperature, and without danger of harming the heater units.

In the top 40 of the switch box 27 is a slot 41 for the accommodation of the handle 26. To keep water from being spilled through this slot, I provide a slide 42 which snugly receives the handle section 26 and is movable along ways 43 raised slightly above the level of the top 40 in order to prevent any water from reaching the slot, the slide being retained in place by screwheads 44.

What I claim is:

1. A water heater comprising a chamber having a floor, heating units rising from said floor, a shell surrounding the heater units but spaced from the wall of said chamber, an outlet from the bottom of the space between said shell and wall, a receiver located above said heater units, and tubes descending from the receiver toward the bottom of the chamber between the heater units, and means admitting water to said receiver.

2. A water heater comprising a chamber having a floor, heater units rising from said floor, a shell surrounding the heater units but spaced from the wall of said chamber, an outlet from the bottom of the space between said shell and wall, a receiver located above said heater units, and tubes descending from the receiver to the bottom of the chamber between the heater units, each tube having a lateral hole near its extremity, and means admitting water to said receiver, said tubes serving both to conduct water from the receiver to the bottom of the chamber and to support the receiver.

3. A water heater comprising a water containing chamber having an electric heater device therein, means including a switch for delivering current to said device, a box containing said switch, the box having a slotted top, a handle movable in said slot controlling said switch, said top having raised ways parallel with said slot at opposite sides thereof, and a slide having a hole snugly fitting said handle movable along said ways.

4. A water heater comprising a vented chamber to which water is admitted, a tube descending from the floor of said chamber, a water receiver located below said tube, a chamber below said receiver having electric heater units therein, tubes rising from the floor of said chamber supporting and communicating with the bottom of said receiver, a shell surrounding said units but spaced from the wall of said chamber, and an outlet through the wall of said chamber.

In testimony that I claim the foregoing invention, I have hereunto set my hand this 2nd day of May, 1918.

R. P. BARNSTEAD.